Feb. 22, 1949.  H. S. JACOBS  2,462,747
WINCH CONTROL
Filed March 28, 1945  3 Sheets-Sheet 1
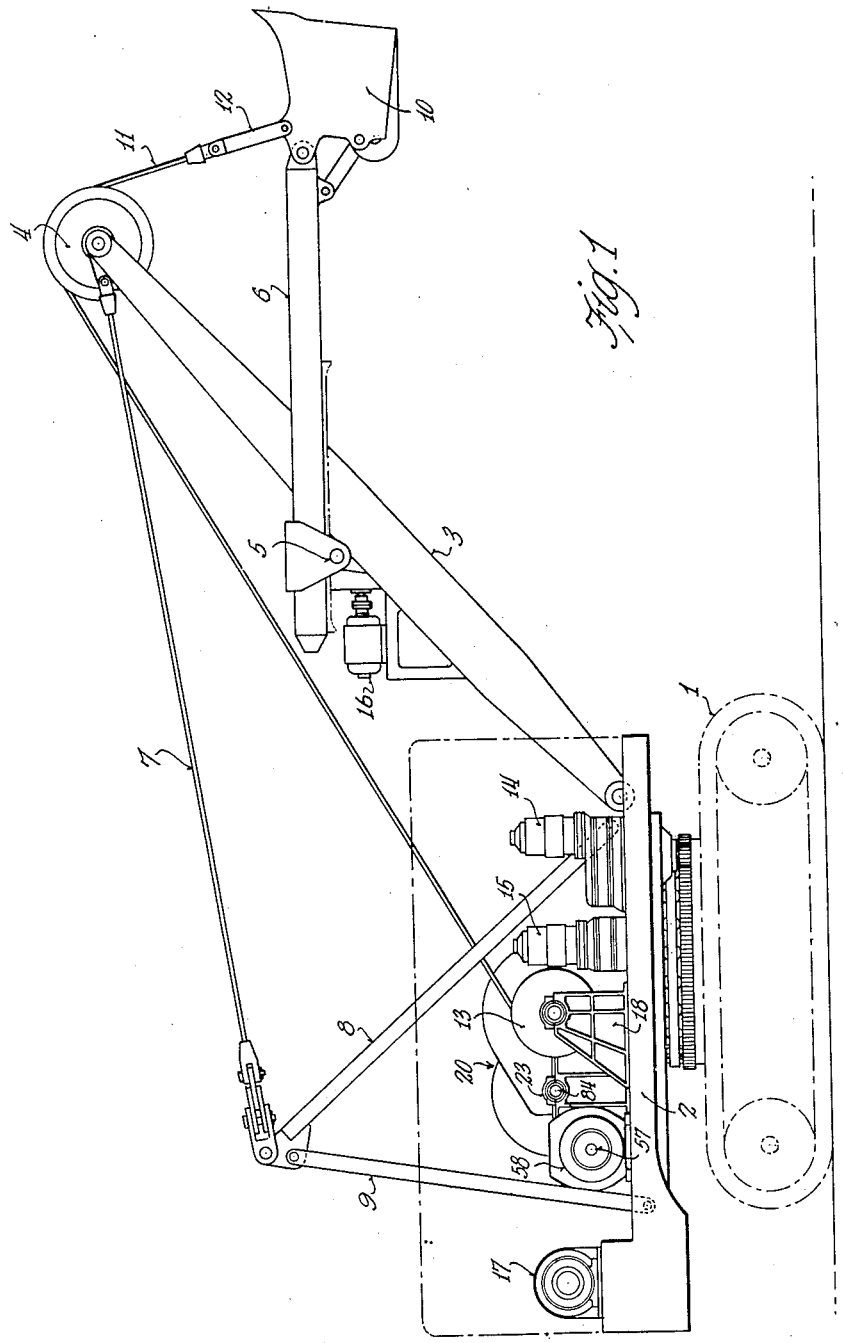
INVENTOR.
Henry S. Jacobs
BY
David A. Foy
ATTORNEY.

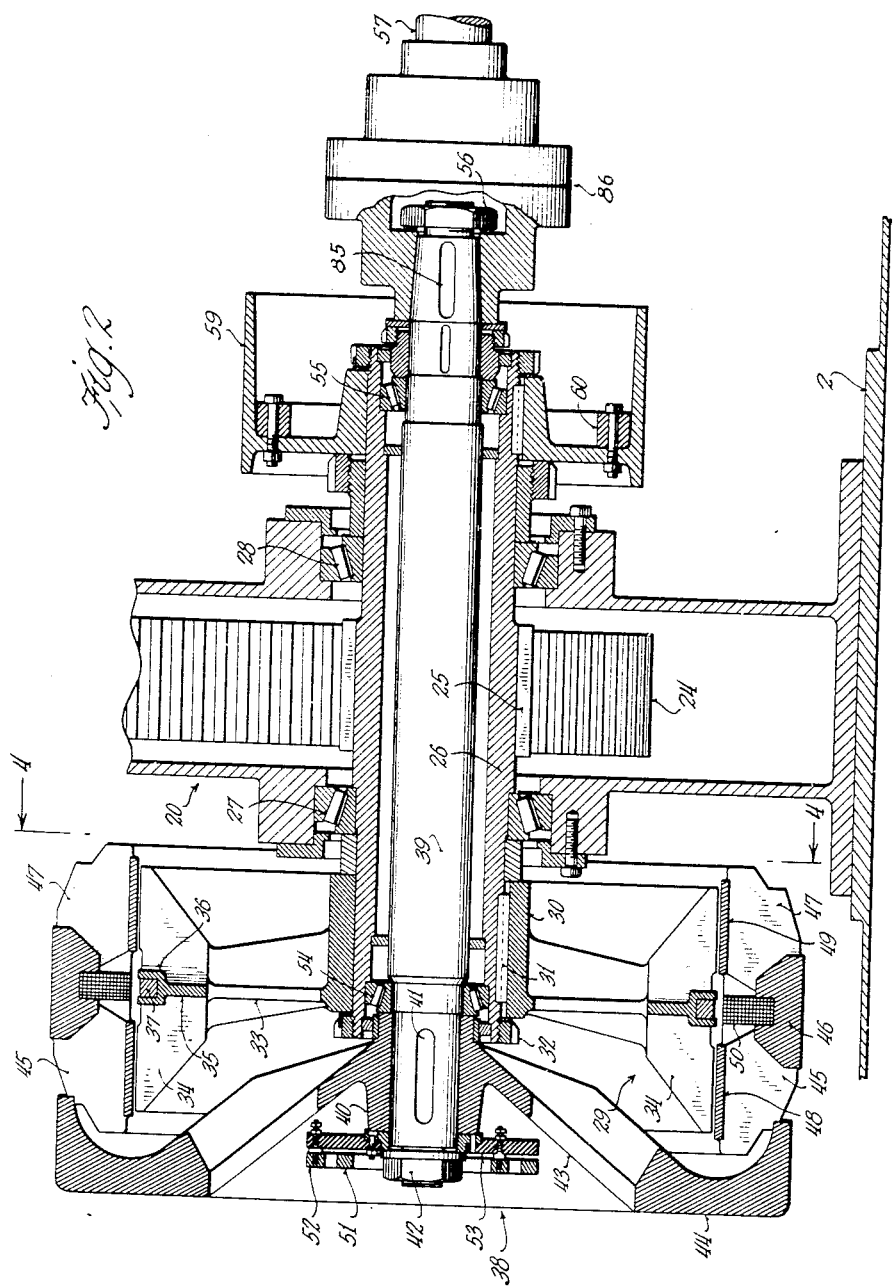

Feb. 22, 1949.   H. S. JACOBS   2,462,747
WINCH CONTROL
Filed March 28, 1945   3 Sheets-Sheet 3
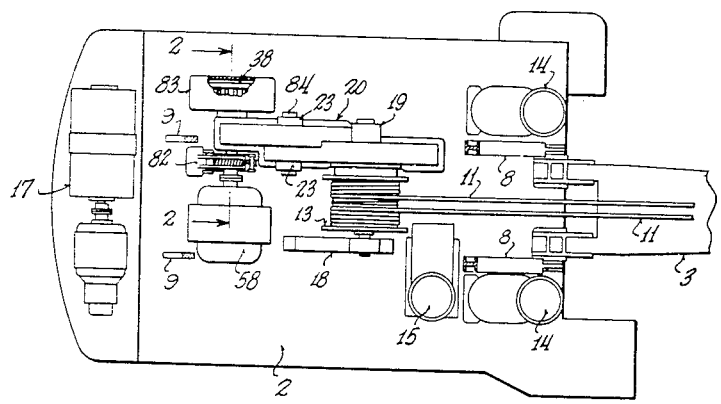
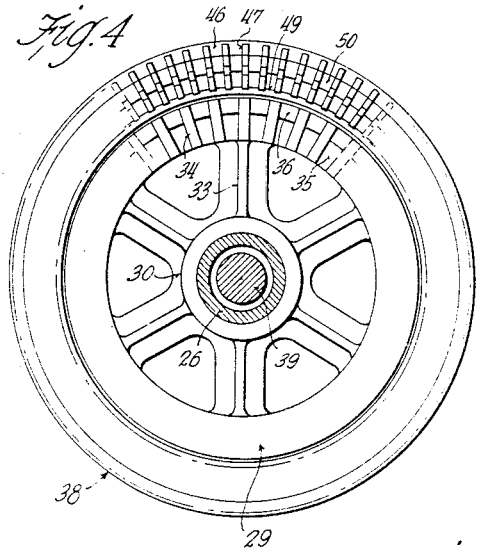
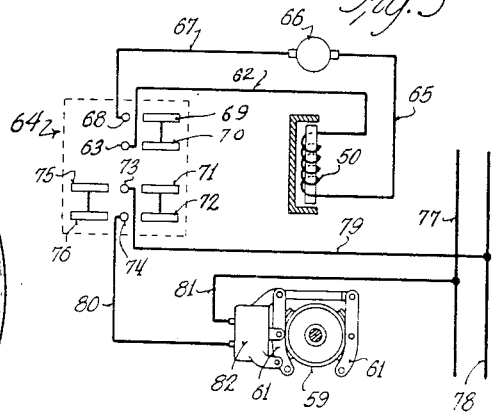
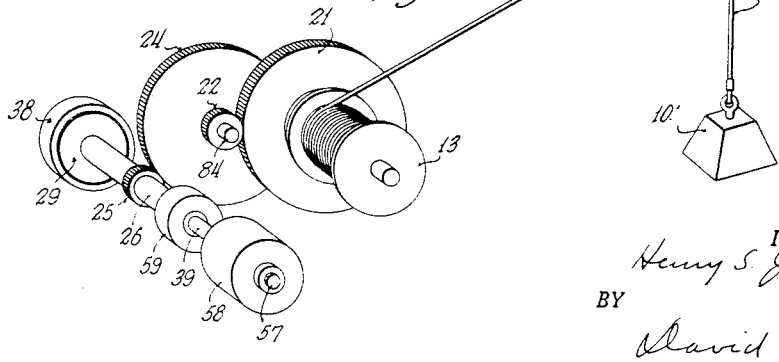
INVENTOR.
Henry S. Jacobs
BY
David A. Fay
ATTORNEY.

Patented Feb. 22, 1949

2,462,747

UNITED STATES PATENT OFFICE 2,462,747

WINCH CONTROL

Henry S. Jacobs, Milwaukee, Wis., assignor to Harnischfeger Corporation, Milwaukee, Wis., a corporation of Wisconsin Application March 28, 1945, Serial No. 585,253

9 Claims. (Cl. 254—187)

This invention relates to power winches and resides more specifically in an apparatus in which a rotatable power source is adapted to be coupled by an eddy current clutch and reduction gearing with a winding drum, the various parts and the inertia properties thereof being related in a novel manner to the end that attainment of dangerous rotational speed during free gravity lowering is precluded, while at the same time satisfactorily prompt response in the initiation of hoisting movement is preserved; the invention also sometimes further resides in the aforesaid arrangement in conjunction with a hollow mounting shaft for the driven clutch member and with electrical arresting means and an energizing circuit for selectively energizing said clutch and said arresting means.

In power driven winches, particularly in the case of winches forming a part of portable machines such as power excavators and the like, dependence upon a power source which rotates at substantially constant speed is expedient. Starting, stopping and reversal of the prime mover to control the movement of the winch is obviously undesirable even where the power source is an electric motor, and numerous attempts have, therefore, been made to provide coupling means which will permit the continuous running of the prime mover. The use of a friction clutch for discontinuing and establishing connection with the prime mover has been resorted to with some success in the case of apparatus of moderate size, but for larger winches, the limitations inherent in a friction clutch become prohibitive.

For the winches of excavating machines of large size, the driving means now having extensive practical application are dependent upon the use of reversible electric motors. The starting, stopping and reversing of an electric machine of this nature involves high peak loads and results in a load factor which detracts from economical use of electric power.

To avoid the limitations and shortcominngs of existing apparatus, it has heretofore been proposed that the winch be arranged to be driven by a continuously-running source of power, and that connection between such source and the winding drum be made through various forms of coupling arrangements other than friction clutches, depending upon gravity to produce the unwinding movement of the drum. Attempts to provide a practical embodiment of this arrangement have heretofore resulted in failure either because the action thereof was too sluggish to meet the high output requirements of an excavating machine, or because free gravity lowering of the empty scoop resulted in dangerous speeds being attained in certain rotating parts.

The instant invention overcomes these shortcomings by utilizing an eddy current clutch in which the moment of inertia of the fastest moving driven part is related in a specific manner to other properties of the apparatus. It has been found that when this is done, a clutch can be provided which is readily capable of transmitting the power required without sluggishness and without excessive heating in spite of frequent alternate lifting and lowering movements, and at the same time the inertia properties of the system as a whole are such that speeds giving rise to dangerous centrifugal forces during lowering are precluded.

This invention is herein described by reference to the accompanying drawings which form a part hereof and in which there is set forth by way of illustration and not of limitation a specific instance of an embodiment of a winch constructed in accordance with this invention.

In the drawings:

Fig. 1 is a side view in elevation of an excavating machine provided with a winch constructed in accordance with this invention;

Fig. 2 is a detailed sectional view in elevation of the clutch part of the apparatus shown in Fig. 1, viewed through the plane 2—2 indicated in Fig. 3;

Fig. 3 is a top plan view on reduced scale partly broken away of the apparatus shown in Fig. 1;

Fig. 4 is a detail view in elevation and in section of the clutch parts of the winch viewed through the plane 4—4 indicated in Fig. 2;

Fig. 5 is a wiring diagram of the circuit connections for supplying exciting current to the clutch and brake of the apparatus of the foregoing figures; and Fig. 6 is a diagrammatic showing in perspective of the movable parts only of the apparatus of this invention displayed so as to facilitate the explanation thereof.

The several views of the drawings illustrate one form of this invention applied to the actuation of the dipper hoisting movement of an outstroke power excavator of well known form. In this case the excavator is made up of a travelling base 1, shown in outline only, upon which there is revolvably mounted the deck 2 of an excavator cab. Extending from the deck 2 is a boom 3 carrying head sheaves 4 at its outer end and at its approximate mid point a thrusting and pivoting mounting or shipper shaft 5 for dipper sticks 6. The boom 3 is braced by back stays 7 secured to the top on an A frame composed of members 8 and 9. Secured to the ends of the dipper sticks 6 is an excavating dipper 10 to which a pair of hoisting cables 11 is secured through a bail 12. The hoisting cables 11 extend over head sheaves 4 and from thence to a winch drum 13 for simultaneous winding thereon.

Swinging movement of the excavator is produced through the action of swing motors 14, while propulsion of the base 1 is accomplished by the operation of motor 15 and operation of the shipper shaft 5 is performed by the motor 16. All of these motors are arranged to be supplied by regulated current supplied by a motor generator set 17.

The dipper 10, hoisting lines 11 and drum 13 form with other parts a complete winch system in which the essential novelty of the apparatus of this invention resides and which will now be described in greater detail.

Drum 13 is rotatably mounted between an end bearing stand 18 and a bearing 19 contained within a reduction gearing housing 20. Rigidly associated with the drum 13 to turn therewith is a final driving gear 21 which is in meshing engagement, as show in Fig. 6, with an intermediate reduction pinion 22. Intermediate pinion 22 is rigidly secured to a rotatable shaft 84 journalled in bearings 23 provided therefor in housing 20. Likewise rigidly secured to the shaft 84 in driving relationship thereto is an intermediate reduction gear 24 which in turn is in meshing engagement with an initial reduction pinion 25.

Referring now more particularly to Fig. 2, it may be seen that initial reduction pinion 25 is integrally formed with and as a part of a quill shaft 26 which is rotatably carried in bearings 27 and 28 mounted in the gear reduction housing 20. Power for driving shaft 26 is delivered thereto by a torque receiving member of an eddy current clutch, generally designated 29, having a hub 30 held in place on the left end of shaft 26 by a feather key 31 and a screw collar 32. Torque receiving member 29 is formed of webbed spokes 33 extending from hub 30 and terminating in a peripheral series of transverse flux localizing fingers 34 of magnetic material integrally joined with a circular fellow 35. The outer rim of the fellow 35 is flared at 36 and externally grooved to receive a highly conducting shading ring 37 which serves to moderate the rate of torque alteration when clutch excitation is initiated and terminated. By reason of the approximation to the form of a fan-impeller which is exhibited by the torque receiving member 29, a considerable volume of cooling air is placed in motion thereby when in operation.

Closely surrounding the torque receiving member 29 is a torque imparting member of an eddy current clutch generally designated 38, the same being mounted for rotation with and upon a power input shaft 39. Torque imparting member 38 is provided with a hub 40 which is secured to shaft 39 by a key not shown held in a key-way 41 and further by the clamping action of an end nut 42. Extending outwardly from the hub 40 are spokes 43 which terminate in a main supporting rim 44 with which there is integrally formed a peripheral series of spaced, transverse, radial cooling fins 45 formed of magnetic material. Cooling fins 45 in turn merge integrally with a magnetic seat ring 46 from the opposite side of which a set of integrally formed, spaced, transverse, magnetic, radial cooling fins 47 extend.

The inwardly facing edges of the cooling fins 45 and 47 integrally join respectively with magnetic eddy current sweep bands 48 and 49 the inner circular faces of which are spaced a very small distance from the tips of the flux localizing fingers 34. Within an inwardly facing groove in the seat ring 46 there is located an exciting winding 50 the same extending entirely around the member 38 in the position shown. The ends of the winding 50 are brought through terminals not shown to electrical connection with slip rings 51 and 52 carried on an insulating mounting plate 53 secured to the end of shaft 39. Brushes not shown engage the slip rings 51 and 52 to provide electrical access to the winding 50 carried in the rotatable member 38.

Shaft 39 is rotatably mounted with respect to quill shaft 26 by means of conical roller bearings 54 and 55 and by reason of the nature of these bearings precise radial and axial alignment between the torque imparting member 38 and the torque receiving member 29 is at all times preserved. The maintenance of this precise alignment is facilitated by the wide spacing of bearings 54 and 55 and by the location of bearing 54 at a point which bisects the magnetically induced loading between members 38 and 29. In this way preservation of a small, accurate and constant air gap between members 29 and 38 is insured a consideration of primary importance in the case of an eddy current clutch. An exacting problem in alignment of mounting pads which would be otherwise required if shafts 26 and 39 extended in opposite directions is thus avoided and the overall width of the apparatus is restricted to a width no greater than the length of one of the shafts alone. As appears in Fig. 3 the external clutch member 38 is surrounded by a vented housing 83.

The right hand end of the shaft 39 is rigidly attached to a coupling 86 through a key seated in a key-way 85 and a clamping nut 56 as shown. The coupling 86 in turn is secured in driven relationship to a shaft 57 of a driving motor 58 preferably of the squirrel cage type designed for operation with substantial slip.

In normal operation the rotor of motor 58, its shaft 57, the coupling 86, the shaft 39 and the clutch member 38 constitute a continuously running assembly of substantial inertia, storing considerable energy because of the flywheel effect thereof. This energy is available to be drawn upon at will and serves to very markedly diminish the peak power requirements of the motor 58 so that it operates with a more favorable load factor, than would otherwise be the case. The moment of inertia of this assembly, therefore, need not be restricted and in fact the larger it is, within reasonable limits, the more advantageous the results that will be obtained.

By reason of the continuously running character of the member 38, the cooling fins 45 and 47 thereof acting as centrifugal blower blades, continually draw strong currents of cooling air from the left of band 48, the right of band 49 and from between them and these streams are discharged peripherally on both sides of the seat ring 46. Heat originating in the bands 48 and 49 and conducted into the cooling fins is thus continually carried away at a rapid rate. Heat is also removed directly from the bands 48 and 49 by these same streams of air and also by an augmented circulation caused by the motion of flux localizing fingers 34.

When the winding 50 is excited, a toroidal flux system is established which may be traced, for example, by starting in the seat ring 46. From the ring 46 (considering the lower part of the same only) flux passes, let us say, clockwise through the cooling fins 45 and thence into the sweep band 48 where it is intensely localized in restricted areas by reason of the localizing fingers 34 on the opposite side of the air gap. Flux which bridges the air gap then crosses through and to the right hand side of the fingers 24 where it again crosses an air gap and arrives in the sweep band 49, likewise in local areas of high intensity. From the band 49 the flux then passes through the fins 47 back to the starting point in the seat ring 46. When winding 50 is excited with member 38 running and member 29 at rest the local areas of high flux intensity in the bands 49 and 49 sweep therethrough at a rapid rate causing the establishment of eddy currents which create new magnetic fields of such nature as to urge the member 29 to follow the motion of member 38. Winding 50 is preferably so proportioned and supplied with current as to create substantial magnetic saturation and when thus excited and with slip as described above the maximum torque transmitting capability of the clutch is being exercised. As member 29 accelerates and approaches the speed of the member 38 and the slip between them diminishes, the intensity of eddy currents diminishes and the torque transmitted diminishes so that at normal, steady full load of the clutch the torque transmitted is very substantially less than the maximum. Under normal, steady full load conditions there will, of course, still be a substantial amount of slip between the members 29 and 38 since there can be no torque transmitted unless some slip is prevailing. In a thoroughly ventilated clutch as herein disclosed there will be found to be a fairly definite ratio or relationship between maximum torque and normal full load torque.

In an apparatus constructed in accordance with this invention the moment of inertia of the torque receiving member 29 and associated parts is of primary importance and in order that the same be adjusted to fall within the range desired, it is convenient to mount a brake drum 59 of adjustable inertia directly upon the quill shaft 26 as shown. The drum 59 may be loaded at will to produce any final adjustment in moment of inertia desired by proper selection of a replaceable loading rim 60, or the proportions of drum 59 may be made such as to embody the adjustment without the use of any extraneous element. Normally applied, electromagnetically released brake shoes 61, not shown in Fig. 2, but appearing in Figs. 3 and 5, are arranged to act upon drum 59 for purposes to be more fully described.

As shown in Fig. 5, one end of winding 50 may be connected by a lead 62 with a stationary contact 63 of a drum controller 64. The other end of winding 50 may be connected through a lead 65 with a source of excitation current 66 which may be in turn connected by a lead 67 with another stationary controller contact 68. Electrically connected commutator segments 69 and 70 thus serve to complete the excitation circuit for the winding 50 when controller 64 is thrown in one direction. At the same time with the controller in position to excite winding 50, electrically connected commutator segments 71 and 72 by engaging stationary contacts 73 and 74 serve to complete a circuit from power leads 77 and 78 through conductors 79, 80 and 81 for the excitation of brake releasing coil 82. When this is done, torque transmitted through the clutch members 33 and 29 is applied to shaft 26 and brake shoes 61 are released from the drum 59 thus causing drum 13 to revolve and wind in the hoisting line 11. As illustrated in Fig. 6, the winch system as a whole is a preloaded system in which the hoisting line 11' is permanently connected with a predetermined load 10' corresponding to the empty weight of the dipper 10. Termination of hoisting occurs when the controller 64 is returned to mid position thus deenergizing winding 50 and applying the brake shoes 61. Lowering movement is accomplished by throwing the controller 64 to the opposite position where commutator segments 75 and 76 again cause release of the brake shoes 61 but in this position winding 50 remains unexcited. Under these conditions the load 10', that is to say, the weight of the dipper causes unwinding of the drum 13 accompanied by acceleration of the reduction gearing and the driven clutch assembly as descent of the load continues. As more fully explained hereinafter, the parts are so proportioned that acceleration to excessive or destructive speeds is precluded. Lowering is terminated by again throwing the controller 64 to mid position.

The assembly constituting the shaft 26, the pinion 25, the brake drum 59 and the inner clutch member 29 constitutes an integral unit which makes up the highest speed part of the winch beyond the clutch air gap. This unit is proportioned to the remaining parts of the winch as a whole so that its moment of inertia, that is to say, the product of weight times radius of gyration squared in terms of pounds feet$^2$, is within the numerical limits of $1/9$ to $1/14$ of the numerical magnitude of the maximum torque in pounds feet, which the clutch is capable of transmitting. The torque which the clutch is capable of transmitting is a function of its size, the nature of its excitation, its design, and the degree of slip between driving and driven members. Of these factors, the slip and the nature of excitation, are not fixed by defining structure alone and it is, therefore, necessary to more completely specify the same in order to render definite the torque-inertia ratio range above referred to. In referring to maximum torque it is contemplated that excitation is prevailing which verges upon or exceeds that required to produce practical saturation and that the slip is that which prevails when the driven clutch member is substantially motionless and the driving clutch member is rotating at approximately normal running speed.

While the remaining driven parts of the winch system, that is to say, the reduction gearing, drum, cable and dipper, exhibit momentum effects which contribute to the behavior of the winch system as a whole, the extent of this contribution is nearly negligible for practical purposes by reason of the relationships of the angular velocities of the various parts. To illustrate, if the intermediate gear 24 and associated pinion 22 and shaft 84 together as shown have a moment of inertia twice that of the driven clutch member assembly, its momentum will, nevertheless, at all times be but 8 per cent of the momentum of the driven clutch member assembly, since its angular velocity is at all times but one-fifth that of the driven clutch member assembly. In the case of the drum shaft assembly, carrying drum 13, the momentum thereof as shown, even if its moment of inertia be 8 times that of the driven clutch member, will at all times be less than 1 per cent of the momentum of the driven clutch member assembly, since its angular velocity will at all times be but one twenty-fifth that of the driven clutch member assembly. The cables 11 and dipper 10 make proportionally smaller contributions.

The above relationships are based upon the relative speeds of the parts as shown, but it may be seen that in any winch system employing reduction gearing having a substantial driving ratio, the only part of major importance from the inertia standpoint is the highest speed part, that is to say, the driven clutch member assembly and this is true throughout the entire range of all normal design variations. By reason of this, the inertia-torque ratio above defined and explained may validly be prescribed by simple reference to the inertia of the driven clutch member assembly only, particularly so, if a small average allowance for all incidental effects be taken into account. In prescribing an inertia-torque ratio herein of from $1/9$ to $1/14$, an average of the various incidental effects, such as, momentum of other winch parts, friction, windage and the like have been taken into account and it has been found that these vary in company with changes in size and capacity of the winch as a whole so that satisfactory performance of excavating machines of various sizes and design may be obtained when the inertia-torque ratio is held within the range specified.

While there is a considerable range of optional proportions for designs capable of any particular duty required, it will be found difficult to maintain the prescribed inertia-torque ratio in cases where an attempt is made to employ prime movers having abnormally low or high rates of rotation. It should, therefore, be understood that in stating the inertia-torque ratios herein specified, that the same do no purport to be of utility in designs of abnormal or extreme character. For general convenience and for the purpose of obtaining good performance it is preferred that a prime mover be employed which turns the driving part of the clutch at approximately 700 to 900 R. P. M., but it is within the limits of possible design to employ rotational speeds for this part which are from one-half to twice the rate given.

Since the desired object to be attained is to provie a winch which will not only promptly accelerate the dipper but which will pull it through normal work at full working speed without hesitation, a very substantial torque at moderate slip is required, and this torque because of the inherent characteristics of an eddy current clutch, will be in the neighborhood of one-tenth the maximum torque which the clutch will exert at full slip. With this taken into account, the relationship between power, on the one hand, and speed and torque, on the other, provides a definite guide for the proportioning of the entire winch for any given capacity which may be specified. It would be possible, therefore, to state for any given prime mover speed, a definite range of moment of inertia for the driven clutch member assembly in terms of the primemover horse power. However, since this introduces an additional factor into the definition of the ratio in question, it is preferred to state the same in terms of clutch torque only as above given.

By restricting the inertia-torque ratio in accordance with this invention to the limits stated, unduly sluggish operation of the excavator is avoided on the one hand while on the other the danger of attainment of explosive centrifugal effects in the driven clutch member is avoided. If the inertia-torque ratio be made too high, the lowering of the dipper becomes too slow. This is particularly important in view of the fact that any slowing down of the lowering movement must synchronize with the swing movement in order to produce satisfactory overall operation of the excavator. Consequently, any slowing down of the lowering movement calls for a corresponding increase of swinging time. There must be two swinging movements in each operating cycle. Consequently, any retardation of the lowering movement is doubled in its end effect on the overall operating cycle. Furthermore, the acceleration at the start of a digging cycle may be deficient if the inertia-torque ratio be too high. If the inertia-torque ratio be too low, free gravity dropping of the empty dipper will cause the driven clutch member assembly to accelerate to excessive speeds. It has been found that this danger, particularly where the machine is converted from the form shown to use as a dragline, becomes very real as the inertia-torque ratio is diminished below the lower limit herein stated. In accordance with the discovery of this invention, therefore, the desired result is obtained by incorporating with the driven clutch member neither too much nor too little, "flywheel" or inertia effect, and by immediately delivering the power thereform through a transmission having a substantial reduction ratio.

In incorporating with the driven clutch member the desired "flywheel" or inertia effect it is convenient to embody the same in the hollow mounting shaft 26 and the brake drum 59 both of which are thus availed of for a double function. This is particularly desirable since the hollow mounting shaft 26 permits a saving in space, as elsewhere explained herein, which is important in an excvating machine and at the same time furnishes a very effective widely spread bearing mounting for precise maintenance of the all- important air gap of the clutch. At the same time a very exacting problem of alignment which is encountered when driving and driven shafts approach the clutch from opposite sides is avoided.

I claim:

1. In a power driven gravity loaded winch the combination comprising an electric motor adapted for continuous rotation, an eddy current clutch comprising a driving member mounted to be continuously driven by said motor, a driven member mounted for rotation in position close to said driving member and spaced therefrom by a small air gap, and exciting means associated with said driving and driven members for establishing a magnetic field mutual thereto; a winch drum subject to a base gravity load mounted for rotation and adapted to raise and lower said load; a transmission connecting said driven clutch member with said winch drum; said driven clutch member and parts rotatable thereby having a combined equivalent moment of inertia in pounds feet squared which is equal numerically to from $1/9$ to $1/14$ the numerical value of the maximum torque in pounds feet transmittable by said clutch when said exciting means are active and the difference in speeds between said driving and driven members is substantially equal to the speed at which said driven member is driven by said mechanical power source.

2. In a power translating apparatus the combination comprising a source of mechanical power adapted for continuous rotation; an eddy current clutch comprising a driving member mounted to be continuously driven by said mechanical power source, a driven member mounted for rotation in position close to said driving member and spaced therefrom by a small air gap, exciting means associated with said driving and driven members for establishing a magnetic field mutual thereto; a power utilizing member subject to a base load mounted for rotation; and driving means connecting said driven clutch member with said power utilizing member; said driven clutch member and parts subject to movement thereby having a combined equivalent moment of inertia in pounds feet squared which is equal numerically to from $1/9$ to $1/14$ the numerical value of the maximum torque in pounds feet transmittable by said clutch when said exciting means are active and the difference in speeds between said driving and driven members is substantially equal to the speed at which said driving member is driven by said mechanical power source.

3. In a power driven winch the combination comprising a source of mechanical power adapted for continuous rotation; an eddy current clutch comprising a driving member mounted to be continuously driven by said mechanical power source, a driven member mounted for rotation in position close to said driving member and spaced therefrom by a small air gap, and exciting means associated with said driving and driven members for establishing a magnetic field mutual thereto; a winch drum mounted for rotation and adapted to extend and retract a line by unwinding and winding thereon; and driving means connecting said driven clutch member with said winch drum; said driven clutch member and parts rotatable thereby having a combined effective moment of inertia in pounds feet squared numerically equal to from $1/9$ to $1/14$ the numerical value of the maximum torque in pounds feet transmittable by said clutch when said exciting means are active and the difference in speeds between said driving and driven members is approximately equal to the speed at which said driving member is driven by said mechanical power source.

4. In a winch the combination comprising a prime mover adapted for continuous running and having a rotatable power output shaft, a winding drum mounted for winding and unwinding movement, a hoisting line controllably connected with a load handling instrumentality suspended to be responsive to gravity and secured to said winding drum to be wound thereon, a driving member of an eddy current clutch mounted for rotation and connected to the output shaft of said prime mover to be driven thereby, a driven member for said eddy current clutch mounted for rotation in torque receiving relationship to said driving member, an eddy current clutch exciting winding associated with said driving and driven members, said driving and driven members and said exciting winding being adapted to cooperate to transmit a maximum predetermined torque when the slip between said driving and driven members is approximately equal to the running speed of said driving member, a take-off pinion and shaft therefor secured to said eddy current clutch driven member to rotate therewith, said take-off pinion shaft and eddy current clutch driven member having a combined moment of inertia in pounds feet squared which is numerically equal to from $1/9$ to $1/14$ said maximum predetermined torque of said eddy current clutch in pounds feet, and a transmission having a substantial driving ratio of reduction forming a gearing connection between said pinion and said winding drum.

5. In a winch the combination comprising a prime mover adapted for continuous running and having a rotatable power output shaft, a winding drum mounted for winding and unwinding movement, a hoisting line controllably connected with a load handling instrumentality suspended to be responsive to gravity and secured to said winding drum to be wound thereon, a driving member of an eddy current clutch mounted for rotation and connected to the output shaft of said prime mover to be driven thereby, a driven member for said eddy current clutch mounted for rotation in torque receiving relationship to said driving member, an eddy current clutch exciting winding associated with said driving and driven members, said driving and driven members and said exciting winding being adapted to cooperate to transmit a maximum predetermined torque when the slip between said driving and driven members is approximately equal to the running speed of said driving member, a take-off pinion and shaft therefor secured to said eddy current clutch driven member to rotate therewith, a brake-drum on said shaft, said take-off pinion shaft brake-drum and eddy current clutch driven member having a combined moment of inertia in pounds feet squared which is numerically equal to from $1/9$ to $1/14$ said maximum predetermined torque of said eddy current clutch in pounds feet, and a power transmission having a substantial driving ratio of reduction forming a gearing connection between said pinion and said winding drum.

6. In a winch the combination comprising a prime mover adapted for continuous running and having a rotatable power output shaft, a winding drum mounted for winding and unwinding movement, a hoisting line controllably connected with a load handling instrumentality suspended to be responsive to gravity and secured to said winding drum to be wound thereon, a driving member of an eddy current clutch mounted for rotation and connected to the output shaft of said prime mover to be driven thereby, a driven member for said eddy current clutch mounted for rotation in torque receiving relationship to said driving member, an eddy current clutch exciting winding asociated with said driving and driven members, said driving and driven members and said exciting winding being adapted to cooperate to transmit a maximum predetermined torque when the slip between said driving and driven members is approximately equal to the running speed of said driving member, a take-off pinion and shaft therefor secured to said eddy current clutch driven member to rotate therewith, and loading means for said take-off pinion shaft and eddy current clutch driven member adapted to render the combined moment of inertia thereof in pounds feet squared numerically equal to from $1/9$ to $1/14$ said maximum predetermined torque of said eddy current clutch in pounds feet, and a power transmission having a substantial driving ratio of reduction forming a gearing connection between said pinion and said winding drum.

7. In a winch drive the combination comprising an electric motor, a driving shaft extending therefrom and coupled thereto at one end, an eddy current clutch driving member on the opposite end of said driving shaft, a hollow driven shaft surrounding said driving shaft mounted for independent rotation thereon and disposed between said motor and said eddy current clutch driving member, spaced bearings forming a mounting for said hollow shaft adapted to support said hollow shaft for rotation entirely independently of said driving shaft, bearings between said hollow shaft and said driving shaft for supporting said driving shaft for rotation, an eddy current clutch driven member secured to and mounted on said hollow shaft in torque receiving relationship to said eddy current clutch driving member, a pinion on said hollow driven shaft, a winding drum mounted for rotation, and transmission gearing in meshing engagement with said pinion drivingly connected to said winding drum.

8. In a winch drive the combination comprising an electric motor, a driving shaft extending therefrom and coupled thereto at one end, an eddy current clutch driving member on the opposite end of said driving shaft a hollow driven shaft surrounding said driving shaft mounted for independent rotation thereon and disposed between said motor and said eddy current clutch driving member, bearings joining a mounting for said hollow shaft, an eddy current clutch driven member secured to and mounted on said hollow shaft in torque receiving relationship to said eddy current clutch driving member, an exciting winding for said clutch driving and driven members, a pinion on said hollow driven shaft, a winding drum mounted for rotation, a transmission gearing in meshing engagement with said pinion drivingly connected to said winding drum, a brake drum secured to said hollow shaft, electromagnetically controlled releasable friction means adapted to engage said brake drum, and shiftable electrical control means adapted to simultaneously energize said exciting winding and release said friction means when in one position and to realese said friction means only when in another position.

9. In a winch drive the combination comprising an electric motor, a driving shaft, an eddy current clutch driving member on said driving shaft, a driven shaft mounted for independent rotation, an eddy current clutch driven member mounted on said driven shaft in torque receiving relationship to said eddy current clutch driving member, an exciting winding for said driving and driven members, a pinion on said driven shaft, a winding drum mounted for rotation, transmission gearing in meshing engagement with said pinion drivingly connected to said winding drum, a brake drum on said driven shaft, electromagnetically controlled releasable friction means adapted to engage said brake drum, and shiftable electrical control means having an off position, a position adapted to energize said exciting winding and release said friction means simultaneously and a position adapted to release said friction means only.

HENRY S. JACOBS.

REFERENCES CITED

The following references are of record in the file of this patent:

UNITED STATES PATENTS

| Number | Name | Date |
| --- | --- | --- |
| 748,488 | Eastwood | Dec. 29, 1903 |
| 2,193,837 | Winther | Mar. 19, 1940 |
| 2,317,290 | McIlvried | Apr. 20, 1943 |
| 2,357,517 | Burdick et al. | Sept. 5, 1944 |
| 2,393,211 | Winther | Jan. 15, 1946 |
| 2,408,080 | Lloyd | Sept. 24, 1946 |

FOREIGN PATENTS

| Number | Country | Date |
| --- | --- | --- |
| 321,107 | Great Britain | Oct. 31, 1929 |

---

Certificate of Correction

Patent No. 2,462,747.    February 22, 1949.

HENRY S. JACOBS

It is hereby certified that errors appear in the printed specification of the above numbered patent requiring correction as follows:

Column 3, line 1, for "top on" read *top of*; column 5, line 10, for "fingers 24" read *fingers 34*; line 17, for "bands 49" read *bands 48*; column 6, line 1, for "members 33" read *members 38*; line 51, for "motionles" read *motionless*; column 7, line 49, for "provie" read *provide*; column 8, line 39, for "excvating" read *excavating*; column 11, line 24, for "joining" read *forming*;

and that the said Letters Patent should be read with these corrections therein that the same may conform to the record of the case in the Patent Office.

Signed and sealed this 18th day of October, A. D. 1949.

[SEAL]

THOMAS F. MURPHY,
*Assistant Commissioner of Patents.*